United States Patent Office 2,854,383
Patented Sept. 30, 1958

2,854,383

PROCESS FOR THE MANUFACTURE OF 9α-HALO STEROIDS

Hershel L. Herzog, Mountain View, N. J., assignor to Schering Corporation, Bloomfield, N. J., a corporation of New Jersey No Drawing. Application June 7, 1955
Serial No. 513,903

9 Claims. (Cl. 195—51)

The present invention relates to halogenated pregnadienones and to a process for manufacturing same.

More particularly, this invention relates to the production of 1,4-pregnadiene-9α-halo-3,20-diones containing an oxygen function at C–11 and which may contain an alpha-hydroxyl group at C–17, from 4-pregnene-9α-halo-3,20-diones or from 3-hydroxy (or 3-acyloxy)-5-pregnene-9α-halo-20-ones.

The compounds of this invention may be represented by the following general formula:

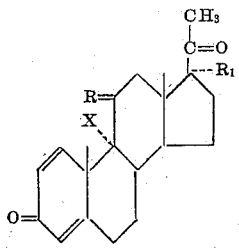

wherein R is a member of the group consisting of O and (H, OH); $R_1$ represents hydrogen or OH; while X is a halogen atom having an atomic weight less than that of iodine, i. e., fluorine, chlorine, or bromine.

The compounds of the present invention are useful adrenocortical substances and are active as gluco- or mineralocorticoids as determined by liver glycogen and sodium retention assays, respectively. I have found that the introduction of an additional double bond into the A-ring produces substances which are more potent than the parent mono-unsaturated steroids. This increased potency is advantageous, especially where undesirable side effects are exhibited with the 3-keto-$\Delta^4$-substances, since smaller doses of the diene are made possible which will give the desired pharmacological response with concomitant reduction in side effects. The glucocorticoid activity of the new substances is roughly inversely related to the atomic weight of the halogen atom present at C–9. Especially potent substances as determined by the liver glycogen and sodium retention assays are compounds of the general formula wherein $R_1$ is H and X is fluoro. Of the compounds of the general formula wherein $R_1$ is OH, a particularly potent glucocorticoid is the steroid corresponding to the general formula wherein

and X is a fluorine.

The compounds of the invention can be converted into the corresponding 21-hydroxy compounds, by subjecting them in known manner to the action of an hydroxylating member of the genus Ophiobolus, for example, *O. herbotrichus*, in the manner described by Meystre et al., Helv., 37, 1548 (1954). The 17-desoxy compounds can be converted into 17α-hydroxy compounds by the action of a culture of a 17α-hydroxylating organism, such as *Trichothecium roseum*. In this way, both the 17α-hydroxy and 17-desoxy compounds of our invention can be converted into the 9α-halo and particularly the 9α-fluoro, derivatives of the dienes of Compound E and Compound F (9α-halo-1,4-pregnadiene-17α,21-diol-3,11,20-trione and 9α-halo-1,4-pregnadiene-11β, 17α,21 - triol-3,20-dione) which are potent anti-inflammatory substances, and are more fully described and claimed in the application of Arthur Nobile, entitled "Halogenated Steroids and Process for Manufacturing Same," Ser. No. 513,902, filed simultaneously with the present application.

The novel 1,4-pregnadienones of the present invention may be prepared from the corresponding 4-pregnenones by the action of a culture of a dehydrogenating bacterium of the genus Corynebacterium, and especially the species *Corynebacterium simplex* (A. T. C. C. No. 6946), and *Corynebacterium hoagii* (A. T. C. C. No. 7055). The microbiological action is such that dehydrogenation of the A ring, that is, the introduction of a $\Delta^1$-bond occurs in good yield. This, by starting with any one of the known 4-pregnene analogs, the compounds of our invention are conveniently prepared by means of a one-step microbiological transformation.

A number of the compounds of the general formula above presented are chemically convertible into one another, and thus it is not necessary to start with the 4-pregnene analog of the substance desired. For example, by subjecting 9α-fluoro-4-pregnene-3,11,20-trione to the dehydrogenating action of the above-indicated microorganisms, there results the formation of 9α-fluoro-1,4-pregnadiene-3,11,20-trione. The trione may be transformed to the 11β-ol by selective reduction of the 11-keto group according to known procedures, as by blocking the 3- and 20-keto groups by selective ketalization with, for example, ethylene glycol, followed by reduction of the 11-keto group by means of an alkali metal borohydride or of an alkali metal aluminum hydride (as described, for example, in the copending application of Eugene P. Oliveto et al., Ser. No. 291,781, filed June 4, 1952, now abandoned), after which the ketal groups are hydrolyzed by heating with acid. An 11β-ol diene, on the other hand, can be converted to the corresponding 11-keto diene by oxidation, as with chromic acid in pyridine at room or below room temperatures.

The starting compounds for the process of the invention are preferably comprised within the following general formula:

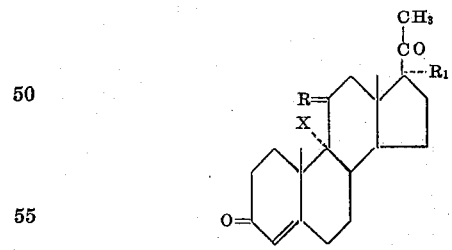

wherein R, $R_1$ and X are as above defined.

The above-named organisms and particularly *C. simplex*, have been found to be capable of oxidizing secondary hydroxyl groups, and likewise of hydrolyzing the esters of such alcohols. Accordingly, there may be employed, instead of the starting compounds represented by the formula just given, the corresponding compounds in which the 3-carbon is substituted by a hydroxyl group or by an acyloxy group, the double bond in such case being in the 5,6-position. The acyloxy group is preferably acetoxy, but may be other ester groups which are not toxic to the microorganism, such as other lower alkanoyloxy groups like propionyloxy, butyryloxy, succinyloxy, and also aroyloxy, like benzoyloxy and phthalyloxy. Other suitable acid groups are cyclopentyl and cyclohexyl acetoxy, and also inorganic acid groups, like that of phorphoric, polyphosphoric and sulfuric acids. It will be understood that the specific character of the ester group is not controlling in our process, it being necessary only that it be non-toxic toward the microorganism.

The dehydrogenating step whereby a double bond is introduced at the 1-position of the 10,13-dimethyl steroid molecule is accomplished by subjecting the starting compound to the action of a dehydrogenating species of the genus Corynebacterium. Satisfactory results have been obtained with C. simplex and C. hoagii, of which the first is generally preferred. The culture is capable, as already mentioned, not only of introducing a $\Delta^1$-double bond, but also of oxidizing a 3-hydroxyl group to a keto group with simultaneous shifting of a 5,6-double bond to the 4,5-position. Where the compound operated on has an ester group in the 3-position, such ester group will be hydrolyzed.

In order to obtain a desirable growth of, for example, Corynebacterium simplex (A. T. C. C. No. 6946) for the process of this invention, a suitable nutrient medium is prepared containing carbohydrate, organic nitrogen, co-factors, and inorganic salts. It is possible to omit the use of carbohydrate without completely impairing the growth of the organism. The steroid compound, in the solid condition or dissolved or suspended in a water-miscible solvent which is non-toxic toward the organism, is added to the cultivated microorganism in a broth medium under sterile conditions. This culture is then shaken, aerated or simultaneously aerated and agitated, in order to enhance the growth of the microorganism and the biochemical conversion of the steroid substrate. The steroid may be added to the broth medium and then inoculated with the bacterium, or the cultivated microorganism in broth medium may be added to the steroid. In certain cases, depending on the condition of the reaction medium, it may be more desirable to obtain optimum growth of the microorganism before the addition of the steroid. Alternatively, enzyme preparations obtained in known manner from cultures of the microorganism may be used in my process.

Described more in detail, my process may be conducted as follows: The bacterium, such as Corynebacterium simplex, is cultivated in a suitable nutrient medium under aerobic conditions. After cultivation of the microorganism, the cell mass may be harvested by centrifuging the nutrient broth, decanting the supernatant liquid and suspending the cell mass in saline. A suitable volume of the cell suspension is then seeded into a desirable nutrient medium for supporting growth of the microorganism. The nutrient medium employed may be a yeast extract (Difco), casein hydrolysate (N–Z-Amine) (Type B Sheffield), corn steep liquor, water extract of soybean oil meal, lactalbumin hydrolysate (Edamine-Sheffield Enzymatic), fish solubles, and the like.

Inorganic salts are desirable to maintain a pH level in the reaction medium of between 6.8 and 7.2; but the use of such salts for buffering the reaction mixture may be omitted. The omission of inorganic salts causes the pH to rise from an initial value of 6.8 to about 7.7–8. This, however, will still permit the formation of the desired steroidal end products. The optimum temperature for growth of the selected microorganism is 37° C., but the temperatures may vary between 25° and 37°, and even between 20° and 40° C. The time of reaction may vary from as little as 3 hours to as much as 48 hours. The length of time which is employed will depend on the steroid which is being transformed. Any water-miscible, non-toxic (to the organism) solvent may be employed to dissolve or suspend the steroid prior to mixing with the culture. I prefer to use ethanol or acetone in such amounts that the final concentration of these solvents in the reaction mixture is no higher than about 7% and may amount to only traces; owing to evaporation, the final concentration of the organic solvent may even be practically zero.

Following the completion of the dehydrogenation process, which may be accompanied by hydrolysis when 3-esters are used, with oxidation of the 3-hydroxyl, the products of reaction may be recovered from the mixture by extraction with a suitable water-immiscible solvent, by filtration, by adsorption on a suitable adsorbent, or by any of the other procedures commonly used in the art. For extraction, chlorinated lower hydrocarbons, ketones, and alcohols are useful. These include chloroform, methylene chloride, trichloroethane, ethylene dichloride, butanol, diethylketone, and others. I prefer to use extraction as the method for isolating the steroidal products. Following extraction, the products may be isolated by concentration of the extracts to a small volume or to dryness. Purification of the residues may be then accomplished in several ways. In many instances, simple recrystallizations from a suitable solvent or solvent mixture, such as acetone, methylene chloride, ethanol, acetone-hexane, methylene chloride-hexane, etc. affords the desired dienone in excellent yield and high state of purity.

The compounds of this invention may be administered orally or parenterally as required. For oral administration, the compounds may be formulated into tablets, capsules and the like, being preferably compounded with an inert pharmaceutical carrier, like sugars, starches, gums, clays, diatomaceous earths and calcium and magnesium carbonates; while for parenteral administration, they are preferably prepared in the form of aqueous or oily suspensions and administered, generally, intra-muscularly. In addition, the compounds may be applied topically, for which purpose they can be formulated into ointments, creams and the like with suitable unguent or creamy vehicles or carriers.

The following examples describe the invention more in detail, but for illustrative purposes only, and are not intended to indicate the scope of the invention, such scope being defined rather in the appended claims.

EXAMPLE 1

9α-fluoro-1,4-pregnadiene-11β-ol-3,20-dione

To a 300 ml. Erlenmeyer flask are added 100 ml. of 0.1% yeast extract (Difco) containing 9.0 ml. of 0.2 M potassium dihydrogen phosphate and 9.0 ml. of 0.2 M disodium hydrogen phosphate. The flask and its contents are sterilized by autoclaving for 15 minutes at 120° C. and to the sterile medium is added 1 ml. of a 1% suspension of Corynebacterium simplex (A. T. C. C. 6946). The flask and its contents are incubated at 28° C. for 24 hours.

To a second 300 ml. Erlenmeyer flask are added 2 ml. of ethanol containing 25 mg. of 9α-fluoro-4-pregnene-11β-ol-3,20-dione. The 24-hour growth culture is transferred aseptically to the flask containing the steroid and the mixture is incubated at 28° C. and shaken for 10 hours. At the end of that time the reaction mixture is extracted thoroughly with chloroform and the chloroform extracts are concentrated to a residue. The residue is crystallized from acetone-hexane, affording 6.0 mg. of crystalline 9α-fluoro-1,4-pregnadiene-11β-ol-3,20-dione.

EXAMPLE 2

9α-fluoro-1,4-pregnadiene-3,11,20-trione

By substituting 9α-fluoro-4-pregnene-3,11,20-trione, milligram for milligram for the starting compound and following the procedure and quantities described in Example 1, there are obtained 5.7 mg. of 9α-fluoro-1,4-pregnadiene-3,11,20-trione.

EXAMPLE 3

9α-chloro-1,4-pregnadiene-11β-ol-3,20-dione

To a 300 ml. Erlenmeyer flask are added 100 ml. of 0.1 yeast extract (Difco) containing 9.0 ml. of 0.2 M potassium dihydrogen phosphate and 9.0 ml. of 0.2 M disodium hydrogen phosphate. The flask and its contents are sterilized by autoclaving for 15 minutes at 120° C. and to the sterile medium is added 1 ml. of a 1% suspension of *Corynebacterium hoagii* (A. T. C. C. 7055). The flask and its contents are incubated at 28° C. for 24 hours.

To a second 300 ml. Erlenmeyer flask are added 2 ml. of ethanol containing 25 mg. of 9α-chloro-4-pregnene-11β-ol-3,20-dione. The 24-hour growth culture is transferred aseptically to the flask containing the steroid and the mixture is incubated at 28° C. and shaken for 10 hours. At the end of that time the reaction mixture is extracted thoroughly with chloroform and the chloroform extracts are concentrated to a desidue. The residue is srystallized from acetone-hexane, and there are obtained 4.1 mg. of crystalline 9α-chloro-1,4-pregnadiene-11β-ol-3,20-dione.

EXAMPLE 4

*9α-chloro-1,4-pregnadiene-3,11,20-trione*

By substituting 9α-chloro-4-pregnene-3,11,20-trione, milligram for milligram, in the procedure described in Example 3, there are obtained 5.2 mg. of 9α-chloro-1,4-pregnadiene-3,11,20-trione after recrystallization from acetone-hexane.

EXAMPLE 5

*9α-bromo-1,4-pregnadiene-11β-ol-3,20-dione*

By utilizing 25 mg. of 9α-bromo-4-pregnene-11β-ol-3,20-dione and following the procedure of Example 1, 5.8 mg. of the corresponding bromodienedione are obtained.

EXAMPLE 6

*9α-bromo-1,4-pregnadiene-3,11,20-trione*

By following the procedure of Example 3, 25 mg. of 9α-bromo-4-pregnene-3,11,20-trione yielded 5.4 mg. of the corresponding 1,4-diene as a white crystalline substance.

EXAMPLE 7

*9α-fluoro-1,4-pregnadiene-11β,17α-diol-3,20-dione*

To a 300 ml. Erlenmeyer flask are added 100 ml. of 0.1% yeast extract (Difco) containing 9.0 ml. of 0.2 M potassium dihydrogen phosphate and 9.0 ml. of 0.2 disodium hydrogen phosphate. The flask and its contents are sterilized by autoclaving for 15 minutes at 120° C. and to the sterile medium is added 1 ml. of a 1% suspension of *Corynebacterium simplex* (A. T. C. C. 6946). The flask and its contents are incubated at 28° C. for 24 hours.

To a second 300 ml. Erlenmeyer flask are added 2 ml. of ethanol containing 25 mg. of 9α-fluoro-11β,17α-dihydroxyprogesterone. The 24 hour growth culture is transferred aseptically to the flask containing the steroid and the mixture is incubated at 28° C. and shaken for 10 hours. At the end of that time the reaction mixture is extracted thoroughly with chloroform and the chloroform extracts are concentrated to a residue. The residue is crystallized from acetone-hexane, affording 8.0 mg. of crystalline 9α-fluoro-1,4-pregnadiene-11β,17α-diol-3,20-dione.

EXAMPLE 8

*9α-fluoro-1,4-pregnadiene-17α-ol-3,11,20-trione*

Subjecting an equivalent quantity of 9α-fluoro-4-pregnene-17α-ol-3,11,20-trione to the dehydrogenating action of *Corynebacterium simplex* as described in Example 7, there are obtained 6.1 mg. of the corresponding 1,4-diene after recrystallization from acetone-hexane.

EXAMPLE 9

*9α-chloro-1,4-pregnadiene-11β,17α-diol-3,20-dione*

To a 300 ml. Erlenmeyer flask are added 100 ml. of 0.1% yeast extract (Difco) containing 9.0 ml. of 0.2 M potassium dihydrogen phosphate and 9.0 ml. of 0.2 M disodium hydrogen phosphate. The flask and its contents are sterilized by autoclaving for 15 minutes at 120° C. and to the sterile medium is added 1 ml. of a 1% suspension of *Corynebacterium hoagii* (A. T. C. C. 7055). The flask and its contents are incubated at 28° C. for 24 hours.

To a second 300 ml. Erlenmeyer flask are added 2 ml. of ethanol containing 25 mg. of 9α-chloro-11β,17α-dihydroxyprogesterone. The 24 hour growth culture is transferred aseptically to the flask containing the steroid and the mixture is incubated at 28° C. and shaken for 10 hours. At the end of that time the reaction mixture is extracted thoroughly with chloroform and the chloroform extracts are concentrated to a residue. The residue is crystallized from acetone-hexane, yielding 9.3 mg. of crystalline 9α-chloro-1,4-pregnadiene-11β,17α-diol-3,20-dione.

EXAMPLE 10

*9α-bromo-1,4-pregnadiene-17α-ol-3,11,20-trione*

This compound is obtained according to the procedure of Example 9 by utilizing 9α-bromo-4-pregnene-17α-ol-3,11,20-trione as starting material. From 25 mg. of the starting material, there are obtained 10.2 mg. of the corresponding diene.

The 17α-hydroxylation of the 17-desoxy compounds of the present invention with *Trichothecium roseum*, or other 17α-hydroxylating species of the genus Trichothecium can follow the procedure described in the copending application of Hershel L. Herzog et al., Ser. No. 484,588, filed January 27, 1955.

I claim:

1. Process for preparing compounds of the formula:

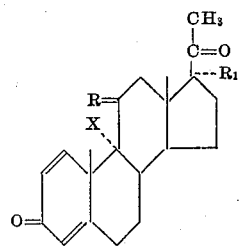

wherein X is a halogen atom having an atomic number less than that of iodine; R is a member of the group consisting of O and (H, OH); and $R_1$ is a member of the group consisting of H and OH, which comprises subjecting the corresponding Δ⁴-pregnene compound to the action of a dehydrogenating microorganism of the genus Corynebacterium.

2. Process according to claim 1, wherein the microorganism is *Corynebacterium simplex*.

3. Process according to claim 1, wherein the microorganism is *Corynebacterium hoagii*.

4. Process according to claim 1, wherein R is O, and $R_1$ is OH.

5. Process according to claim 1, wherein R is H, OH, and $R_1$ is OH.

6. Process according to claim 1, wherein X is fluoro, R is O, and $R_1$ is H.

7. Process according to claim 1, wherein X is fluoro, R is O, and $R_1$ is OH.

8. Process according to claim 1, wherein X is fluoro, R is H, OH, and $R_1$ is OH.

9. Process according to claim 1, wherein X is fluoro, R is H, OH, and $R_1$ is H.

References Cited in the file of this patent

UNITED STATES PATENTS

| | | |
|---|---|---|
| 2,186,906 | Mamoli | Jan. 9, 1940 |
| 2,341,110 | Mamoli | Feb. 8, 1944 |

(Other references on following page)

UNITED STATES PATENTS

| | | |
|---|---|---|
| 2,602,769 | Murray | July 8, 1952 |
| 2,649,402 | Murray | Aug. 18, 1953 |
| 2,658,023 | Shull | Nov. 3, 1953 |
| 2,666,016 | Hechter | Jan. 12, 1954 |
| 2,676,904 | Jeanloz | Apr. 24, 1954 |
| 2,735,855 | Djerassi | Feb. 21, 1955 |
| 2,736,734 | Sarett | Feb. 28, 1955 |
| 2,703,805 | Rosenkranz | Mar. 8, 1955 |
| 2,705,237 | Djerassi | Mar. 29, 1955 |
| 2,763,671 | Fried et al. | Sept. 18, 1956 |
| 2,798,118 | Bernstein et al. | Apr. 16, 1957 |

OTHER REFERENCES

Vischer: Experientia IX, 10 (1953), pp. 171–172.
Fried et al.: J. A. C. S. 75 (1953), pp. 5764–5765.
Finch et al.: Mfgrs. Chemist, June 1954, pp. 247–251.